(12) United States Patent
Kojima et al.

(10) Patent No.: US 9,891,837 B2
(45) Date of Patent: Feb. 13, 2018

(54) MEMORY SYSTEM

(71) Applicant: Toshiba Memory Corporation

(72) Inventors: Yoshihisa Kojima, Kawasaki Kanagawa (JP); Tatsuhiro Suzumura, Yokohama Kanagawa (JP); Tokumasa Hara, Kawasaki Kanagawa (JP); Hiroyuki Moro, Hachioji Tokyo (JP); Yohei Hasegawa, Kawasaki Kanagawa (JP); Yoshiki Saito, Yokohama Kanagawa (JP)

(73) Assignee: Toshiba Memory Corporation, Minato-ku, Tokyo (JP)

( * ) Notice: Subject to any disclaimer, the term of this patent is extended or adjusted under 35 U.S.C. 154(b) by 84 days.

(21) Appl. No.: 14/620,814

(22) Filed: Feb. 12, 2015

(65) Prior Publication Data

US 2016/0070471 A1 Mar. 10, 2016

Related U.S. Application Data

(60) Provisional application No. 62/047,316, filed on Sep. 8, 2014.

(51) Int. Cl.
*G06F 3/06* (2006.01)

(52) U.S. Cl.
CPC ............ *G06F 3/061* (2013.01); *G06F 3/0656* (2013.01); *G06F 3/0688* (2013.01)

(58) Field of Classification Search
CPC ..... G11C 16/26; G11C 16/10; G11C 11/5628; G11C 11/5642; G11C 13/004; G11C 7/00; G06F 3/061; G06F 3/0688; G06F 3/0656
See application file for complete search history.

(56) References Cited

U.S. PATENT DOCUMENTS

| | | | |
|---|---|---|---|
| 6,343,352 B1* | 1/2002 | Davis ................. | G06F 13/1626 365/194 |
| 6,882,569 B2 | 4/2005 | Hosono et al. | |
| 2004/0066673 A1* | 4/2004 | Perego ............... | G11C 7/1051 365/200 |
| 2006/0136765 A1* | 6/2006 | Poisner .............. | G06F 11/1441 713/323 |
| 2008/0049513 A1* | 2/2008 | Jeong ................. | G11C 16/102 365/185.22 |
| 2008/0209266 A1* | 8/2008 | Lee ..................... | G06F 11/141 714/16 |

(Continued)

FOREIGN PATENT DOCUMENTS

JP 2013-191263 A 9/2013

*Primary Examiner* — Hiep Nguyen
(74) *Attorney, Agent, or Firm* — White & Case LLP

(57) ABSTRACT

According to one embodiment, a memory system includes a memory and a memory controller. The memory includes a first buffer and a memory cell array. The memory controller includes a second buffer for receiving first data from a host. The memory controller transfers the first data to the first buffer without accumulating a predetermined size of the first data in the second buffer. The memory controller creates second data in the first buffer and programs the second data created in the first buffer into the memory cell array. The second data is formed of a plurality of third data. The third data is first data received from the memory controller by the memory. The size of the second data is equal to a size of a unit in which to program into the memory cell array.

15 Claims, 6 Drawing Sheets

(56) References Cited

U.S. PATENT DOCUMENTS

| | | | |
|---|---|---|---|
| 2010/0199025 A1* | 8/2010 | Nanjou | G06F 12/0246 |
| | | | 711/103 |
| 2012/0079172 A1* | 3/2012 | Yoshida | G06F 12/0607 |
| | | | 711/103 |
| 2012/0159016 A1 | 6/2012 | Morita | |
| 2013/0155779 A1* | 6/2013 | Hamada | G11C 13/004 |
| | | | 365/189.05 |

* cited by examiner

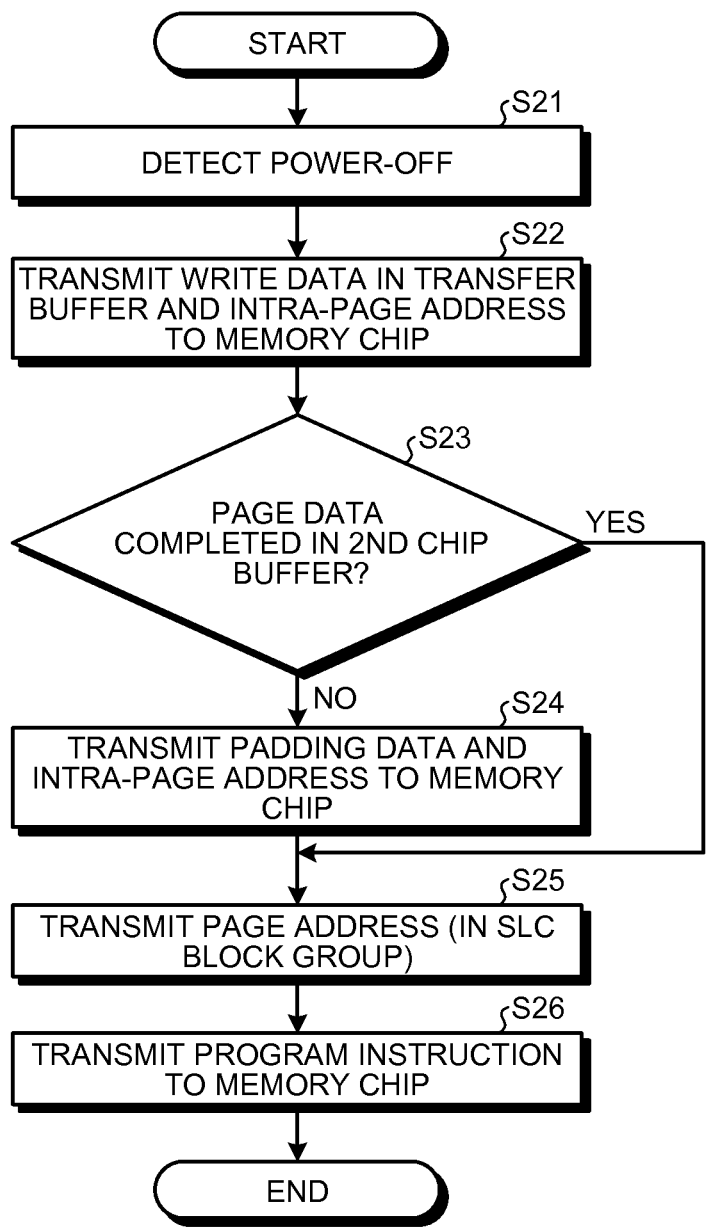

MEMORY SYSTEM

CROSS-REFERENCE TO RELATED APPLICATIONS

This application is based upon and claims the benefit of priority from U.S. Provisional Application No. 62/047,316, filed on Sep. 8, 2014; the entire contents of which are incorporated herein by reference.

FIELD

Embodiments described herein relate generally to a memory system.

BACKGROUND

A memory system comprises a semiconductor memory and a memory controller executing data transfer between a host device and the semiconductor memory. In general, the memory controller comprises a transfer buffer for data transfer between the host device and the semiconductor memory.

BRIEF DESCRIPTION OF THE DRAWINGS

FIG. 8 is a flow chart for explaining the operation of the third embodiment of the memory controller.

DETAILED DESCRIPTION

In general, according to one embodiment, a memory system includes a memory and a memory controller. The memory includes a first buffer and a memory cell array. The memory controller includes a second buffer for receiving first data from a host. The memory controller transfers the first data to the first buffer without accumulating a predetermined size of the first data in the second buffer. The memory controller creates second data in the first buffer and programs the second data created in the first buffer into the memory cell array. The second data is formed of a plurality of third data. The third data is first data received from the memory controller by the memory. The size of the second data is equal to a size of a unit in which to program into the memory cell array.

Exemplary embodiments of a memory system will be explained below in detail with reference to the accompanying drawings. The present invention is not limited to the following embodiments.

First Embodiment

Figure 1:
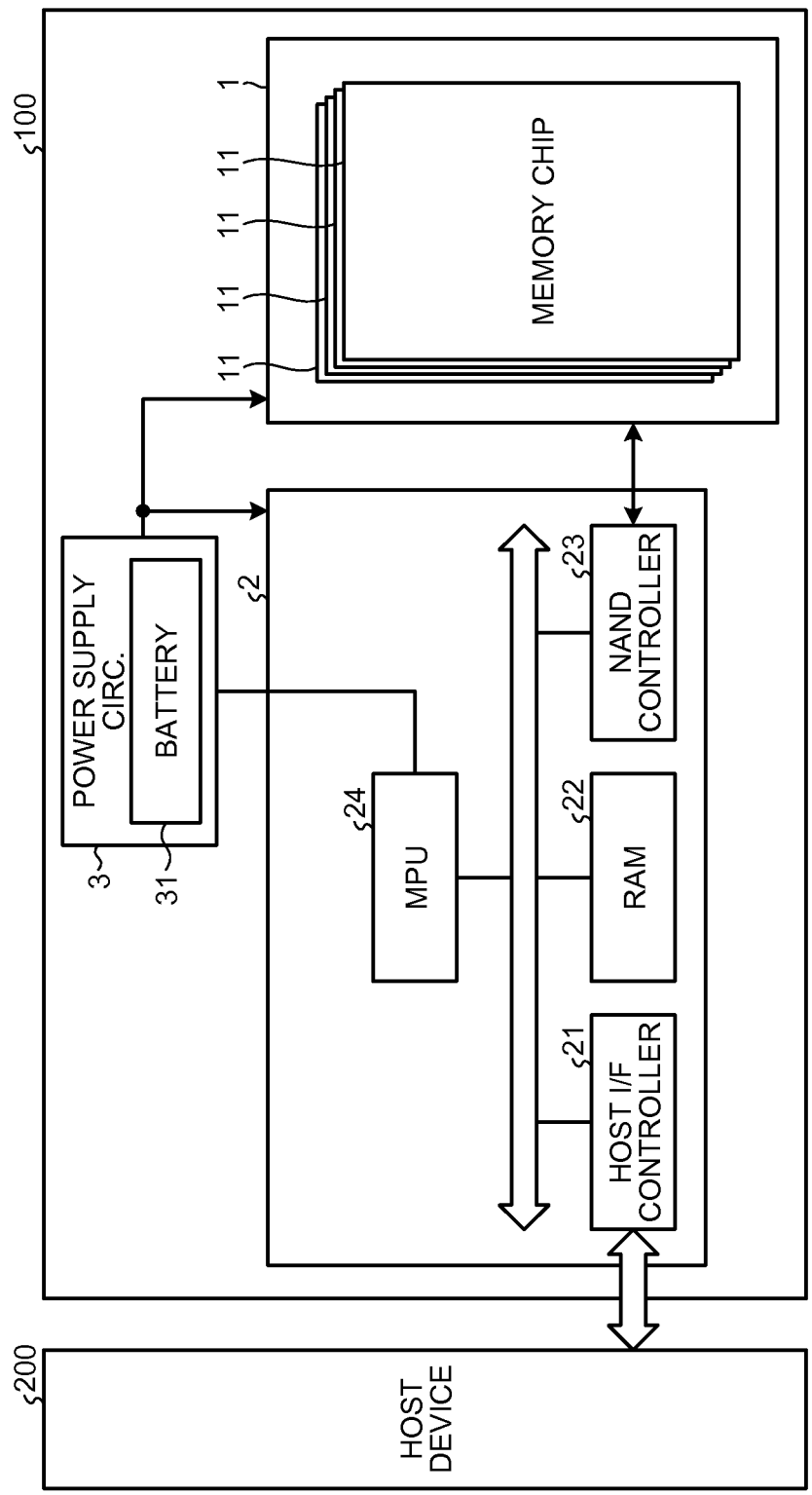
FIG. 1 is a diagram showing an example configuration of a memory system of a first embodiment.

FIG. 1 is a diagram showing an example configuration of a memory system of the first embodiment. The memory system 100 is connected to a host device 200 via a predetermined communication interface. The host device 200 is, for example, a personal computer, a mobile information processing device, or the like. The memory system 100 functions as an external storage device for the host device 200. The memory system 100 can accept access requests (read requests and write requests) from the host device 200. The access requests from the host device 200 each include a logical address specifying the location of data.

The memory system 100 comprises a NAND flash memory (NAND memory) 1, a memory controller 2 that executes data transfer between the host device 200 and the NAND memory 1, and a power supply circuit 3. The memory system 100 may comprise any semiconductor memory instead of the NAND memory 1. For example, the memory system 100 may comprise a NOR flash memory instead of the NAND memory 1.

The memory controller 2 comprises a host interface controller (host I/F controller) 21, a RAM (Random Access Memory) 22, a NAND controller 23, and an MPU 24. The host I/F controller 21, RAM 22, NAND controller 23, and MPU 24 are connected to each other via a bus. The host I/F controller 21 controls a communication interface with the host device 200 and data transfer between the host device 200 and the RAM 22. The NAND controller 23 transmits various instructions to the NAND memory 1 and performs data transfer between the NAND memory 1 and the RAM 22 under the control of the MPU 24. The MPU 24 controls the entire memory controller 2 based on firmware. The MPU 24 cooperates with the NAND controller 23 to function as a processing unit.

The power supply circuit 3 generates power to drive the NAND memory 1 and memory controller 2 based on power supplied externally. The power supply circuit 3 supplies the generated power to the NAND memory 1 and memory controller 2. The power supply circuit 3 comprises a battery 31 in case the supply of external power stops without advance notice.

Figure 2:
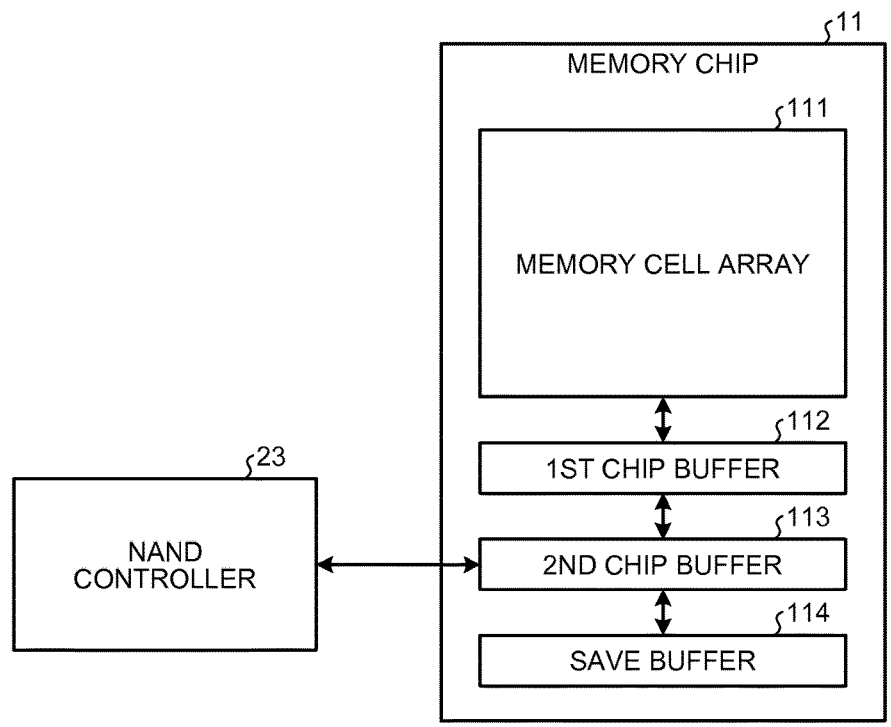
FIG. 2 is a diagram for explaining the configuration of each of memory chips forming a NAND memory.

The NAND memory 1 is formed of one or more, here four, memory chips 11. FIG. 2 is a diagram for explaining the configuration of each of memory chips 11 forming the NAND memory 1. The memory chip 11 comprises a memory cell array 111, a first chip buffer 112, a second chip buffer 113, and a save buffer 114.

The memory cell array 111 consists of multiple blocks. All the data stored in one block is deleted collectively. Each block consists of multiple pages. Program and read are performed on a page basis. Data of a page size to be programmed into the memory cell array 111 and data of the page size read from the memory cell array 111 are each referred to as page data. "Program" refers to raising threshold voltages of the memory cells to voltage values according to data by applying voltages to memory cells forming a page.

The first chip buffer 112, second chip buffer 113, and save buffer 114 each have a capacity of at least one page size. Herein, description will be made assuming that the first chip buffer 112, second chip buffer 113, and save buffer 114 each have a capacity of one page size.

The first chip buffer 112 is a buffer for accessing the memory cell array 111. Specifically, the first chip buffer 112 stores page data immediately before programmed into the memory cell array 111 or page data immediately after read from the memory cell array 111.

The second chip buffer 113 is connected to the NAND controller 23. The second chip buffer 113 is a buffer for receiving data subject to programming from the NAND controller 23 or transmitting data read from the memory cell array 111 to the NAND controller 23.

Figure 3:
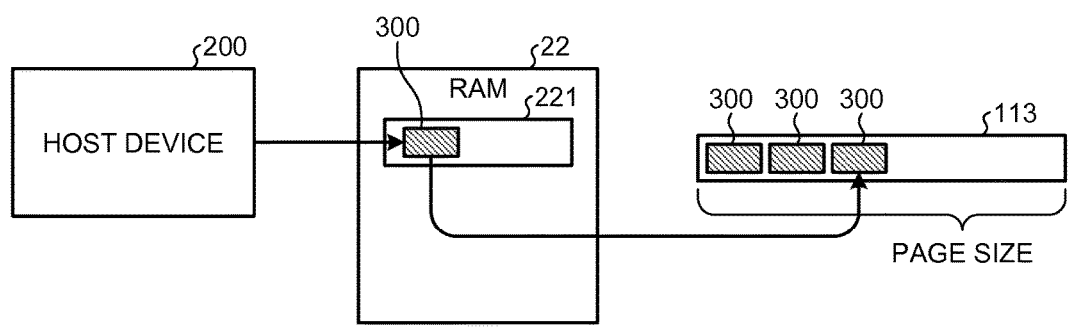
FIG. 3 is a diagram for explaining data transfer.

FIG. 3 is a diagram for explaining data transfer. The host device 200 transmits to-be-written data associated with a write request. Data transfer from the host device 200 to the memory system 100 is performed per predetermined unit size. Data of the predetermined unit size to be transferred from the host device 200 to the memory system 100 is referred to as write data (write data 300). It is supposed that the size of the write data 300 is smaller than the page size.

The RAM 22 comprises a transfer buffer 221. The transfer buffer 221 is a memory area that can temporarily store one or more write data 300 in order to compensate for speed difference between the speed of transfer between the host device 200 and memory controller 2 and the speed of transfer between the memory controller 2 and NAND memory 1. The write data 300 from the host device 200 is stored by the host I/F controller 21 into the transfer buffer 221.

According to the first embodiment, the memory controller 2 can transfer the write data 300 to the NAND memory 1 without waiting until the total size of one or more write data 300 stored in the transfer buffer 221 reaches the size of a write unit. The size of the write unit is, for example, the size of one page per memory chip 11. Where a logical page is formed of multiple pages, the size of the write unit may be the size of the logical page. That is, the size of the write unit may be an integer multiple of the page size. When transfer to the memory chip 11 becomes possible, write data 300 in the transfer buffer 221 is transferred by the NAND controller 23 to the memory chip 11.

The timing when transfer to the memory chip 11 becomes possible is, for example, a timing described as follows. In the case of write, the memory system 100 can notify the execution completion for the write request to the host device 200 when finishing storing write data 300 into the transfer buffer 221. Because the memory system 100 sends a response for the write request to the host device 200 even if programming into the memory chip 11 is not completed, it is possible to apparently reduce latency of the write request for the host device 200 at the time of writing with respect to the host device 200. In contrast, in the case of read, data stored in the memory chip 11 needs to be read. Thus, in order to reduce latency at the time of reading, reading from the memory chip 11 is performed with priority over writing. In this case, at timings when reading from the memory chip 11 is not being performed, transfer to the memory chip 11 is possible. When it reaches a timing when reading from the memory chip 11 is not being performed, the memory controller 2 transfers write data 300 in the transfer buffer 221 to the memory chip 11 regardless of the amount of data stored in the transfer buffer 221.

Here, description will be made assuming that the memory controller 2 transfers each write data 300 to the memory chip 11. The memory controller 2 may convert one or more write data 300 stored in the transfer buffer 221 into a plurality of data of a size smaller than the page size to transmit to the memory chip 11. Each write data 300 stored in the transfer buffer 221 is deleted from the transfer buffer 221 after the completion of the transfer to the memory chip 11.

The memory controller 2 may transmit each write data 300 received from the host device 200, as it is, to the memory chip 11 or process each write data 300 received from the host device 200 and transmit each processed write data 300 to the memory chip 11. Note that the processing includes, for example, encoding for error detection or error correction, or a randomizing process. Further, the processing may be performed in the memory chip 11, not in the memory controller 2.

The memory chip 11 receives each write data 300 from the NAND controller 23 into the second chip buffer 113. The plurality of write data 300 are combined into one page data in the second chip buffer 113. When receiving a program instruction from the NAND controller 23, the memory chip 11 moves page data in the second chip buffer 113 into the first chip buffer 112 and then programs the page data in the first chip buffer 112 into the memory cell array 111.

When receiving a read instruction from the NAND controller 23, the memory chip 11 reads one page data from the memory cell array 111 into the first chip buffer 112 and moves the page data read into the first chip buffer 112 into the second chip buffer 113. Thereafter, when receiving a data outputting instruction from the NAND controller 23, the memory chip 11 outputs data in the second chip buffer 113 to the NAND controller 23.

The save buffer 114 is a memory into which the contents of the second chip buffer 113 are to be saved. When the host device 200 issues a read request while one or more write data 300 are stored in the second chip buffer 113, the one or more write data 300 in the second chip buffer 113 are moved into the save buffer 114.

Note that the RAM 22 comprising the transfer buffer 221 can be of any type. For example, a DRAM (Dynamic Random Access Memory) or an SRAM (Static Random Access Memory) can be used as the RAM 22. Further, the RAM 22 may be provided external to the memory controller 2.

Figure 4:
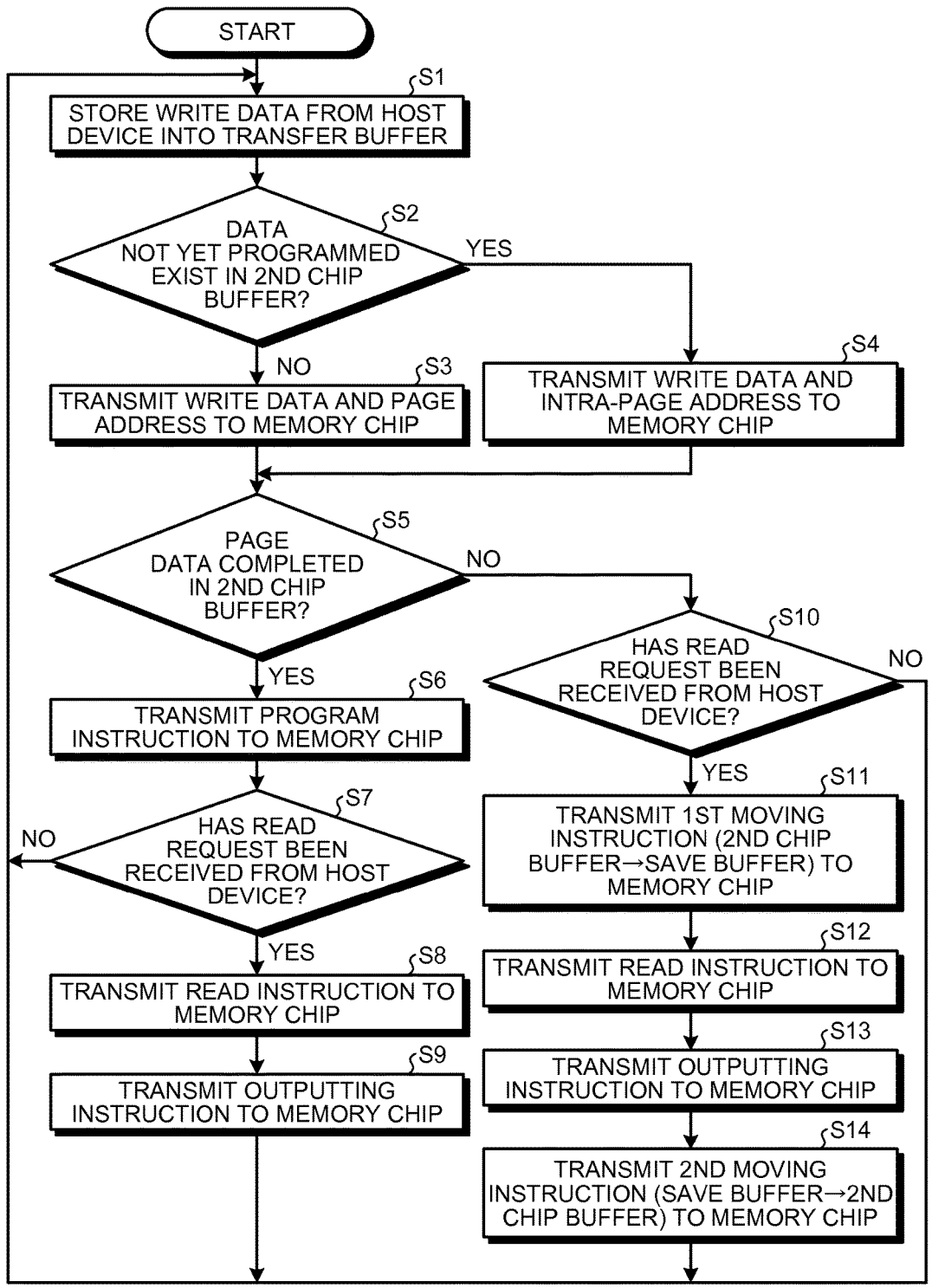
FIG. 4 is a flow chart for explaining the operation of the first embodiment of a memory controller.

FIG. 4 is a flow chart for explaining the operation of the memory controller 2. When receiving write data 300 from the host device 200, the host I/F controller 21 stores the write data 300 into the transfer buffer 221 (S1). The processing unit determines whether data not programmed into the memory cell array 111 exists in the second chip buffer 113 (S2).

If not-yet programmed data is not in the second chip buffer 113 (No at S2), the processing unit transmits the write data 300 and a page address to the memory chip 11 (S3). The page address is an address to identify at least one page in the memory cell array 111. In the process of S3, the processing unit transmits a page address specifying the page into which page data to be created in the second chip buffer 113 is to be programmed. In the process of S3, the processing unit may transmit an intra-page address together with the page address. The intra-page address is an address to identify a location in the page. One page is divided into multiple parts that are respectively identified by intra-page addresses. Where an intra-page address is transmitted, the write data 300 is stored at the location specified by the intra-page address in the storage area of the second chip buffer 113. In the process of S3, for example, an intra-page address specifying the start of the page is transmitted. The memory chip 11, in response to the process of S3, stores the received write data 300 at the start of the second chip buffer 113 (in the case of receiving an intra-page address, at the location specified by the intra-page address). Note that the processing unit may transmit an instruction to clear the second chip buffer 113 to the memory chip 11 before transmitting the write data 300 and the page address.

If not-yet programmed data exists in the second chip buffer 113 (Yes at S2), the processing unit transmits the write data 300 and an intra-page address to the memory chip 11 (S4). In the process of S4, for example, an intra-page address specifying the start of an empty area in the second chip buffer 113 is transmitted. The memory chip 11, in response to the process of S4, stores the received write data 300 at the location specified by the intra-page address in the second chip buffer 113.

After the process of S3 or S4, the processing unit determines whether one page data is completed in the second chip buffer 113 (S5). The processing unit can determine whether one page data is completed by, e.g., counting the number of write data 300 transmitted since the process of S3 was performed. If one page data is completed (Yes at S5), the processing unit transmits a program instruction to the memory chip 11 (S6). The memory chip 11, in response to the process of S6, moves the page data in the second chip buffer 113 into the first chip buffer 112 and then programs the page data moved into the first chip buffer 112 into the page specified by the page address in the memory cell array 111.

After the process of S6, the processing unit determines whether the memory controller 2 has received a read request from the host device 200 (S7). If the memory controller 2 has received a read request from the host device 200 (Yes at S7), the processing unit transmits a read instruction to the memory chip 11 (S8). The read instruction includes at least a page address. The memory chip 11, in response to the process of S8, reads page data from the page specified by the page address in the memory cell array 111 into the first chip buffer 112 and moves the read page data from the first chip buffer 112 into the second chip buffer 113. Then the processing unit transmits an outputting instruction to the memory chip 11 (S9). The memory chip 11, in response to the process of S9, outputs the page data in the second chip buffer 113 to the memory controller 2. The memory controller 2 transmits the data outputted from the memory chip 11 to the host device 200.

The outputting instruction may include an intra-page address. In this case, the memory chip 11 outputs data stored at the location specified by the intra-page address out of page data in the second chip buffer 113. In the process of S9, the processing unit may transmit a plurality of outputting instructions including intra-page addresses that are different or the same sequentially to the memory chip 11.

If one page data is not completed in the second chip buffer 113 (No at S5), the processing unit determines whether the memory controller 2 has received a read request from the host device 200 (S10). If the memory controller 2 has received a read request from the host device 200 (Yes at S10), the processing unit transmits a first moving instruction to the memory chip 11 (S11). The first moving instruction is an instruction to move all the data in the second chip buffer 113 into the save buffer 114. The memory chip 11, in response to the process of S11, moves all the data in the second chip buffer 113 into the save buffer 114. Here, all the data in the second chip buffer 113 refers to, at least, all the write data 300 transferred from the memory controller 2 to be stored into the second chip buffer 113 and not yet programmed into the memory cell array 111, to be exact.

Then the processing unit performs read processing using the second chip buffer 113 that is empty. Specifically, in S12 and S13, the processing unit performs the same processing as in S8 and S9. After the read processing finishes, the processing unit transmits a second moving instruction to the memory chip 11 (S14). The second moving instruction is an instruction to move all the data in the save buffer 114 into the second chip buffer 113. The memory chip 11, in response to the process of S14, moves all the data in the save buffer 114 into the second chip buffer 113.

If the memory controller 2 has not received a read request from the host device 200 (No at S7), or if the memory controller 2 has not received a read request from the host device 200 (No at S10), or after the process of S9, or the process of S14, the process of S1 is executed.

As described above, according to the first embodiment, the memory controller 2 accumulates write data 300 from the host device 200 in the second chip buffer 113, thereby creating page data in the second chip buffer 113. The memory controller 2 can transfer the write data 300 to the memory chip 11 without waiting for page data to be created in the transfer buffer 221, and hence the necessary capacity of the transfer buffer 221 can be reduced.

Further, the memory chip 11 comprises the save buffer 114. By moving the write data 300 stored in the second chip buffer 113 into the save buffer 114, it becomes possible to use the second chip buffer 113 for a response to the read request. Thus, even if a read request is issued before page data is completed in the second chip buffer 113, the memory system 2 can respond to the read request at as high speed as possible.

Data read from the memory cell array 111 into the second chip buffer 113 is acquired by the memory controller 2 and sent to the host device 200. After acquiring data read into the second chip buffer 113, the memory controller 2 returns data moved into the save buffer 114 to the second chip buffer 113. Thus, after reading from the memory chip 11 finishes which is needed in responding to a read request, the memory controller 2 can resume transfer of write data 300 to the memory chip 11.

Note that the second chip buffer 113 and the save buffer 114 may be configured to be able to exchange their functions. For example, the memory chip 11 comprises two buffers: a first variable buffer and a second variable buffer. The processing unit uses either of the first variable buffer and second variable buffer as the second chip buffer 113 and the other as the save buffer 114. The processing unit can switch the buffer to use as the second chip buffer 113 between the first variable buffer and second variable buffer. With this configuration, the processing unit uses the first variable buffer as the second chip buffer 113 in transferring write data 300 to the memory chip 11. At this time, the second variable buffer is used as the save buffer 114. When a read request is issued, the processing unit switches the buffer to use as the second chip buffer 113 from the first variable buffer to the second variable buffer. That is, page data read from the memory cell array 111 is stored into the second variable buffer and outputted from the second variable buffer to the memory chip 11. After data outputting from the second variable buffer to the memory chip 11 finishes, the processing unit switches them to use the first variable buffer as the second chip buffer 113 again. The first variable buffer continues holding write data 300 during first-time buffer switching, while response to a read request is being performed, and during second-time buffer switching. Thus, after the second-time buffer switching, the first variable buffer as the second chip buffer 113 can accept subsequent write data 300. The first variable buffer and second variable buffer are assigned respective different addresses, and the processing unit can specify the buffer to use as the second chip buffer 113 with use of the address assigned to either of the buffers. That is, the processing unit can switch the buffers by transmitting an instruction to swap the address specifying the buffer to be used as the second chip buffer 113 and the address specifying the buffer to be used as the save buffer 114 to the memory chip 11.

Second Embodiment

Figure 5:
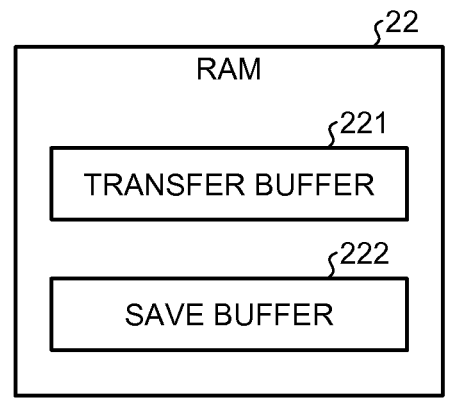
FIG. 5 is a diagram showing the configuration of a second embodiment of a RAM.

FIG. 5 is a diagram showing the configuration of the second embodiment of the RAM 22. In the second embodiment, the RAM 22 comprises a transfer buffer 221 and a save buffer 222. The transfer buffer 221 has the same function as in the first embodiment. The save buffer 222 is a memory area corresponding to the save buffer 114 provided in the memory chip 11 in the first embodiment. That is, the save buffer 222 is a memory area into which the contents of the second chip buffer 113 are to be saved. Here, because the memory system 100 comprises four memory chips 11, the save buffer 222 may have four pages worth of size. Where an upper limit is set on the number of chips that can be read from simultaneously, the save buffer 222 can be configured to have a size smaller than the four pages worth of size.

Figure 6:
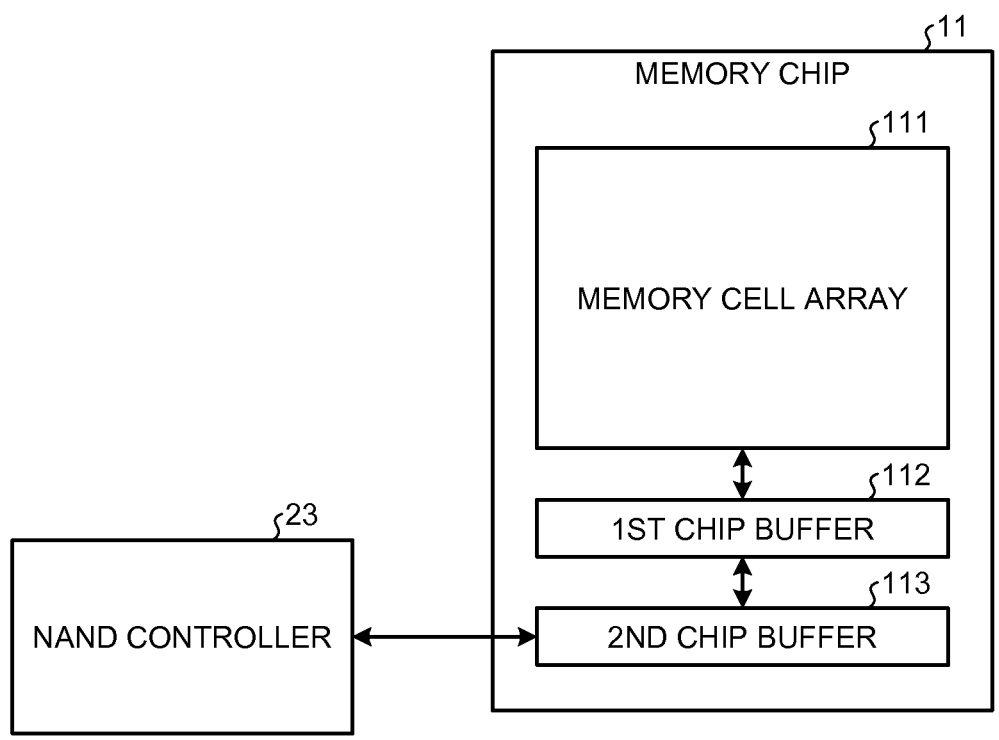
FIG. 6 is a diagram showing the configuration of the second embodiment of the memory chip.

FIG. 6 is a diagram showing the configuration of the second embodiment of the memory chip 11. In the second embodiment, the memory chip 11 has a configuration where the save buffer 114 is omitted from the memory chip 11 of the first embodiment.

In the second embodiment, the processing unit transmits an outputting instruction to output all the data in the second chip buffer 113 to the memory chip 11 instead of transmitting a first moving instruction. All the data in the second chip buffer 113 refers to, at least, all the write data 300 transferred from the memory controller 2 to be stored into the second chip buffer 113 and not yet programmed into the memory cell array 111, to be exact. The processing unit stores all the data read from the second chip buffer 113 according to the outputting instruction into the save buffer 222 in the RAM 22. After the read processing finishes, the processing unit transmits the data in the save buffer 222 to the memory chip 11, thereby returning the data saved in the save buffer 222 to the second chip buffer 113.

As such, even where the save buffer 222 is provided in the memory chip 11, the same effect as in the first embodiment is obtained.

After being transferred to the memory chip 11, the write data 300 stored in the transfer buffer 221 is deleted from the transfer buffer 221. The write data 300 may be deleted from the transfer buffer 221 at a timing other than immediately after transfer to the memory chip 11 finishes. For example, the processing unit may delete already-transferred write data 300 from the transfer buffer 221 at the timing when, it receiving new write data 300 from the host device 200, a space to store the received new write data 300 becomes necessary. Where already-transferred write data 300 is not immediately deleted, as mentioned above, out of all the write data 300 stored into the second chip buffer 113 and not yet programmed into the memory cell array 111, the processing unit may transfer only write data 300 deleted from the transfer buffer 221 to the save buffer 222. Thus, the latency of data read in response to a read request can be reduced.

Third Embodiment

In the third embodiment, a configuration for writing data in the transfer buffer 221 into the NAND memory 1 at power-off will be described.

Figure 7:
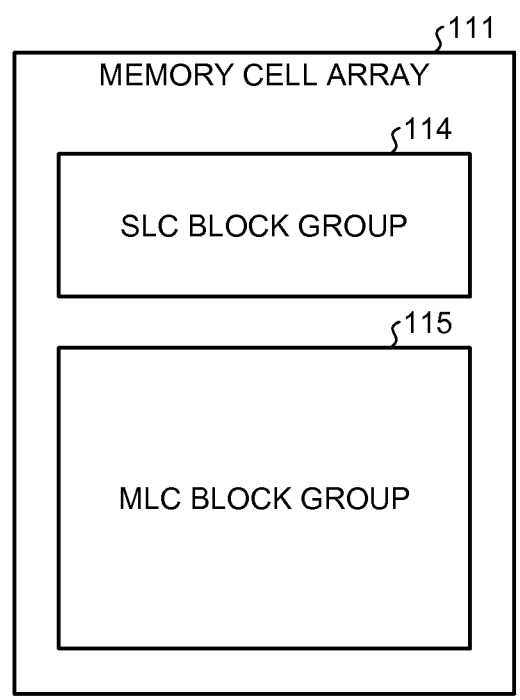
FIG. 7 is a diagram showing the configuration of a third embodiment of a memory cell array.

FIG. 7 is a diagram showing the configuration of the third embodiment of the memory cell array 111. Each of pages forming the memory cell array 111 is formed of multiple memory cell transistors. A multi-level cell (MLC) method is adopted as the storage method of the memory cell array 111. That is, each memory cell transistor can store N bits of information, where N>1. Further, the memory cell array 111 can operate according to a single-level cell (SLC) method in order to speed up programming and improve reliability. According to the third embodiment, the memory cell array 111 comprises an SLC block group 114 formed of one or more blocks operating according to the SLC method and an MLC block group 115 formed of one or more blocks operating according to the MLC method. It can be set, e.g., on a per block basis whether the memory cell array 111 operates according to the MLC method or the SLC method. The memory cell array may be configured such that according to which method each block operates is variable or such that it is fixed beforehand.

In ordinary operation, write data 300 is programmed into the MLC block group 115. Specifically, in the process of S3, the processing unit transmits the page address specifying a page belonging to the MLC block group 115. At power-off, the processing unit programs write data 300 in the transfer buffer 221 into the SLC block group 114. At power-off, if not-yet programmed data exists in the second chip buffer 113, then the processing unit programs the not-yet programmed data together with write data 300 in the transfer buffer 221 into the SLC block group 114.

FIG. 8 is a flow chart for explaining the operation of the third embodiment of the memory controller 2. The processing unit can detect a sudden shutdown of external power supply (power-off). For example, when detecting power-off, the power supply circuit 3 transmits an interrupt signal indicating that power-off has happened to the MPU 24. The MPU 24 as the processing unit can detect power-off through the reception of the interrupt signal. After power-off happens, the power supply circuit 3 switches the source of power supply to the NAND memory 1 and the memory controller 2 from external power to the battery 31. After power-off happens, the operation is performed using power stored in the battery 31.

When detecting power-off (S21), the processing unit transmits write data 300 in the transfer buffer 221 and an intra-page address to the memory chip 11 (S22). The process of S22 is the same as the process of S4, for example. If a plurality of not-yet transmitted write data 300 exist in the transfer buffer 221, the process of S22 is executed multiple times. If no not-yet transmitted write data 300 exists in the transfer buffer 221, the process of S22 is omitted.

When all the not-yet transmitted write data 300 in the transfer buffer 221 are gone, the processing unit determines whether one page data is completed in the second chip buffer 113 (S23). If one page data is not completed in the second chip buffer 113 (No at S23), the processing unit transmits padding data and an intra-page address to the memory chip 11 (S24). The padding data is data to pad with so as to complete one page data in the second chip buffer 113. The padding data is obtained by, e.g., performing a randomizing process on data which is all formed of zeros or ones. In the process of S24, the intra-page address specifying the start of an empty area of the second chip buffer 113 is transmitted. The size of the padding data is equal to the size of the empty area of the second chip buffer 113. If one page data is completed (Yes at S23), then the processing unit skips the process of S24.

Subsequently, the processing unit transmits the page address specifying a page in the SLC block group 114 to the memory chip 11 (S25). The process of S25 is one which changes the program destination so as to program page data into the SLC block group 114, into which programming can be performed at higher speed than into the MLC block group 115. Then the processing unit transmits a program instruction to the memory chip 11 (S26) and finishes operation. In response to the process of S26, the memory chip 11 moves page data in the second chip buffer 113 into the first chip buffer 112 and then programs the page data moved into the first chip buffer 112 into the memory cell array 111. The program location is a page in the SLC block group 114 specified by the page address that the memory chip 11 received in response to the process of S25.

As described above, according to the third embodiment, the memory cell array 111 comprises the SLC block group 114 for backup. The processing unit, at power-off, transfers write data 300 stored in the transfer buffer 221 and not yet transferred to the memory chip 11 to the memory chip 11 and then programs into the SLC block group 114. Because the memory system 100 has a configuration where a lot of write data 300 is not accumulated in the transfer buffer 221, the operation of making data nonvolatile finishes quickly at power-off.

Although, in the above, description has been made assuming that write data 300 is stored into the SLC block group 114 at power-off, the storage destination is not limited to the SLC block group 114. For example, write data may be stored into the MLC block group 115.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
    a memory that comprises a first buffer, a second buffer and a memory cell array; and
    a memory controller, wherein
    the memory controller issues a first request to the memory while first data is stored in the first buffer, the first data being data to be programmed to the memory cell array,
    the memory moves the first data from the first buffer to the second buffer in response to the first request,
    then the memory controller issues a second request to the memory, and
    the memory reads second data from the memory cell array to the first buffer and transmits the second data from the first buffer to the memory controller, the second data being data requested by the second request.

2. The memory system according to claim 1, wherein the memory controller further receives a read request from a host, issues the first request in response to the read request, and transfers, to the host, the second data received from the memory.

3. The memory system according to claim 1, wherein
    the memory controller issues a third request after receiving the second data, and
    the memory moves the first data from the second buffer to the first buffer in response to the third request.

4. The memory system according to claim 1, wherein the memory programs the first data stored in the first buffer to the memory cell array after the first buffer stores the first data of a write unit size, the write unit size being a size of a unit in which the memory programs data into the memory cell array.

5. The memory system according to claim 4, wherein the memory controller issues the first request in a case where the first buffer stores the first data, a size of the first data being less than the write unit size.

6. The memory system according to claim 4, wherein the memory cell array includes a plurality of memory cells, the first data is programed in such a way that each of the plurality of memory cells stores more than one bit.

7. The memory system according to claim 1, wherein in a case where the memory controller detects power-off, the memory controller instructs the memory to program the first data stored in the first buffer to the memory cell array.

8. The memory system according to claim 7, wherein the memory cell array includes a plurality of memory cells, the first data is programed in such a way that each of the plurality of memory cells stores one bit.

9. The memory system according to claim 7, wherein when a size of the first data stored in the first buffer is less than a write unit size, the memory controller instructs the memory to program padding data along with the first data, a total size of the padding data and the first data is equal to the write unit size, and the write unit size is a size of a unit in which the memory programs data into the memory cell array.

10. The memory system according to claim 1, wherein, by swapping an address assigned to the first buffer and an address assigned to the second buffer, the memory further programs the first data stored in the second buffer to the memory cell array.

11. The memory system according to claim 10, wherein the memory controller transmits a swapping instruction to the memory to swap the address assigned to the first buffer and the address assigned to the second buffer.

12. The memory system according to claim 1, wherein the memory controller further receives a write request from a host, and the first data stored in the first buffer is data of which the memory system has notified an execution completion to the host for the write request.

13. The memory system according to claim 1, wherein the memory controller further receives a write request from a host, the first data stored in the first buffer includes a plurality of third data, a size of each of the plurality of third data is based on a unit in which the host transmits data to the memory system, and the memory moves at least one of the plurality of third data from the first buffer to the second buffer in response to the first request.

14. A memory system comprising:
    a memory including a first buffer and a memory cell array to which data stored in the first buffer is programmed in a first size unit;
    a second buffer; and
    a memory controller configured to create, in response to a write request from a host, first data in the second buffer by accumulating a plurality of second data, a size of each of the plurality of second data being based on a unit in which the host transmits data to the memory system, wherein
    the memory controller starts to transmit the first data from the second buffer to the first buffer when a size of the first data is less than the first size unit,
    the memory further includes a third buffer,
    in a case where the memory controller receives a read request from the host, the memory controller instructs the memory to read third data from the memory cell array into the third buffer, the third data is data requested by the read request, by swapping an address assigned to the first buffer and an address assigned to the third buffer, a fourth buffer is switched between the first buffer and the third buffer, the fourth buffer being a buffer for data transfer between the memory cell array and the memory controller, and in transfer of the first data, the first buffer is used as the fourth buffer, and in transfer of the third data, the third buffer is used as the fourth buffer.

15. The memory system according to claim 14, wherein the memory controller transmits a switching instruction to switch the fourth buffer to the memory.

\* \* \* \* \*